June 21, 1927.  J. F. O'CONNOR  1,632,916
FRICTION SHOCK ABSORBING MECHANISM
Filed May 27, 1925  3 Sheets-Sheet 2
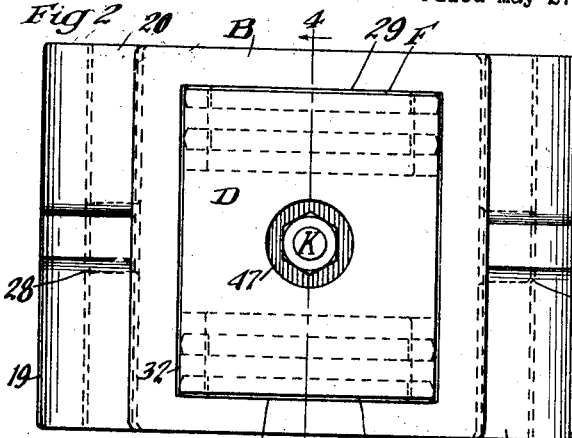
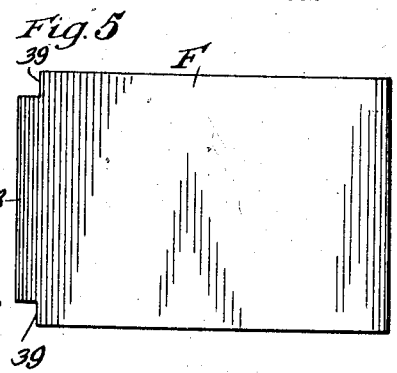
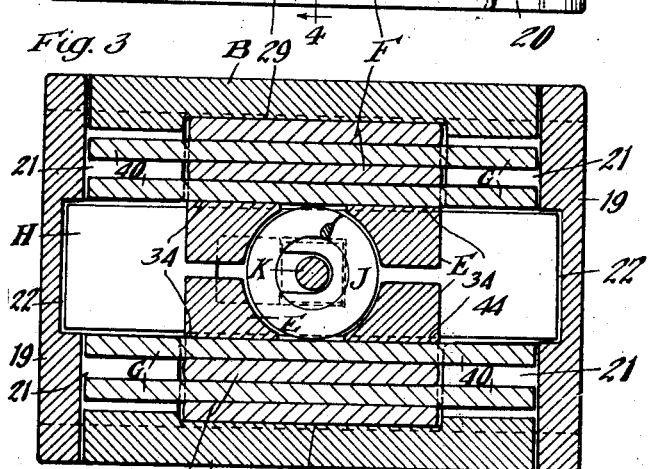
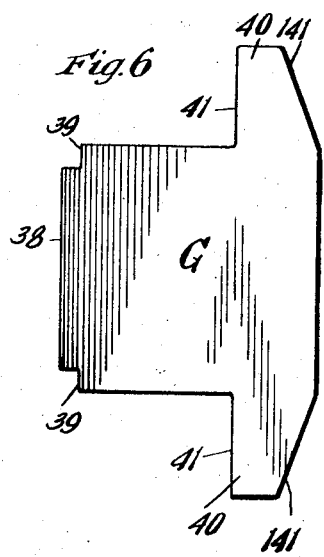
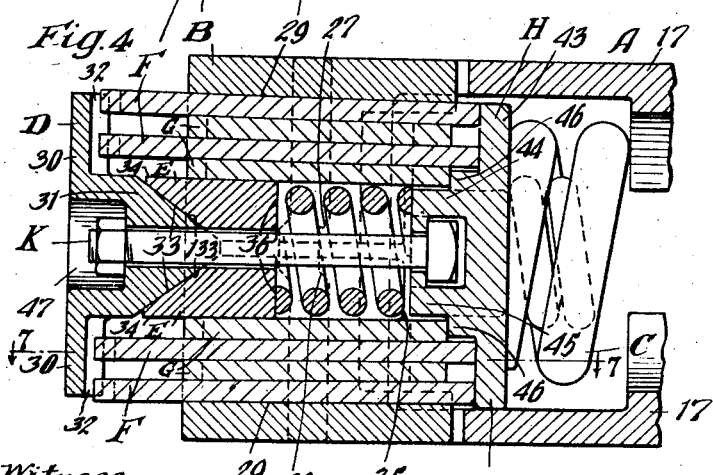
Witness
Wm. Geiger
Inventor
John F. O'Connor
By George I. Haight
His Atty.

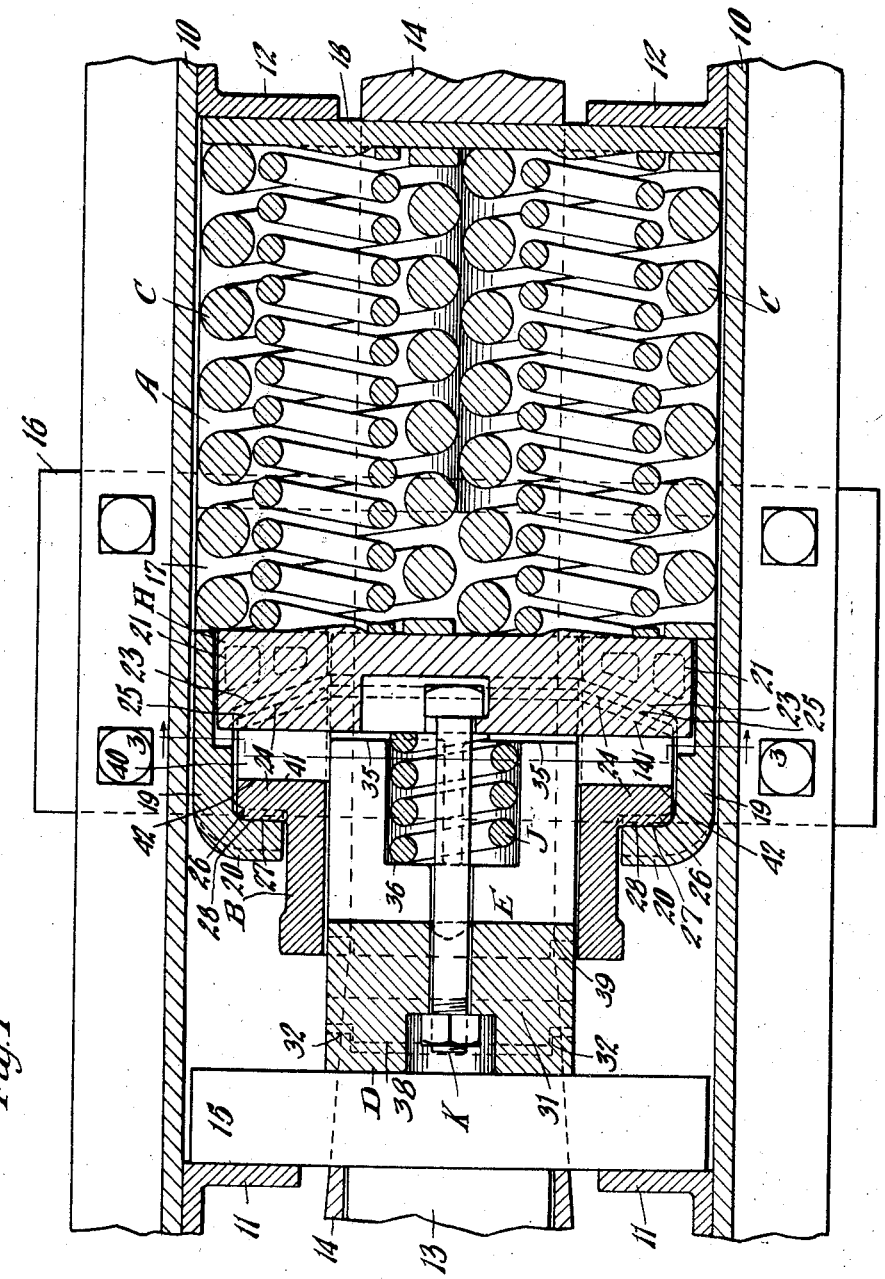

June 21, 1927.  1,632,916
J. F. O'CONNOR
FRICTION SHOCK ABSORBING MECHANISM
Filed May 27, 1925     3 Sheets-Sheet 3
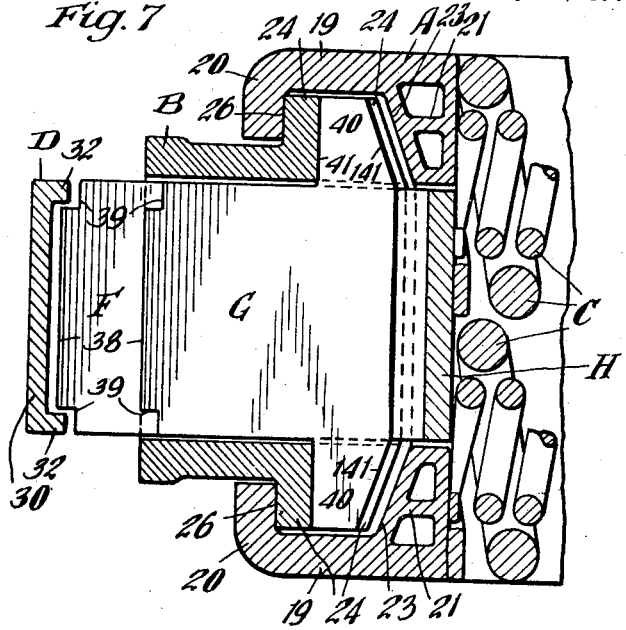
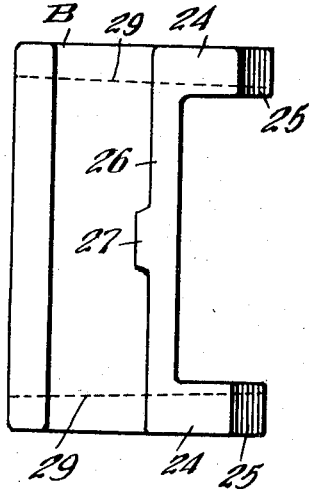
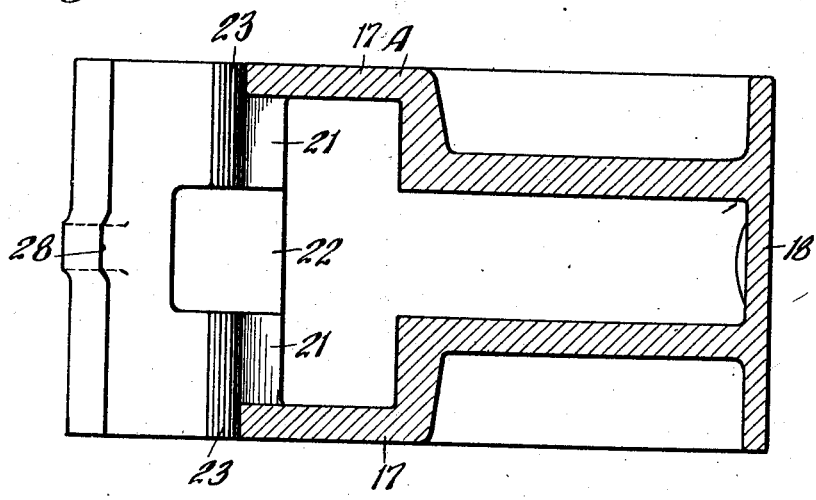
Witness
Wm. Geiger
Inventor
John F. O'Connor
By George I. Haight
His Atty.

Patented June 21, 1927.

1,632,916

UNITED STATES PATENT OFFICE.

JOHN F. O'CONNOR, OF CHICAGO, ILLINOIS, ASSIGNOR TO W. H. MINER, INC., OF CHICAGO, ILLINOIS, A CORPORATION OF DELAWARE.

FRICTION SHOCK-ABSORBING MECHANISM.

Application filed May 27, 1925. Serial No. 33,162.

This invention relates to improvements in friction shock absorbing mechanisms.

One object of the invention is to provide a friction shock absorbing mechanism especially adapted for railway draft riggings, having high capacity combined with relatively light initial action to absorb the the lighter shocks, comprising a friction shell and spring cage having limited relative movement, a plurality of friction plates co-operating with the friction shell and a main spring resistance, wherein the relative movement of the shell and spring cage is resisted by the main spring to produce the light initial action and the heavier final resistance is effected by relative movement of the friction plates with reference to each other and with reference to the friction shell.

Another object of the invention is to provide a friction shock absorbing mechanism of the character indicated, having graduated action and initial light resistance to absorb the lighter shocks, comprising a friction shell and spring cage having limited relative movement, a plurality of friction plates co-operating with the shell and a main spring resistance wherein the light initial action is produced by relative movement of the friction shell and spring cage opposed by the main spring resistance element, and the heavier graduated action effected in stages of successively increasing resistance by relative movement of the friction wedge system with reference to the friction plates, followed by relative movement of the plates with reference to each other and the friction shell.

Other objects and advantages of the invention will more fully and clearly appear from the description and claims hereinafter following.

In the drawings forming a part of this specification Figure 1 is a longitudinal, horizontal, sectional view of a portion of a railway draft rigging, showing my improvements in connection therewith. Figure 2 is a front end elevational view of the shock absorbing mechanism proper. Figure 3 is a vertical, transverse, sectional view corresponding substantially to the line 3—3 of Figure 1. Figure 4 is a vertical, longitudinal, sectional view of the front end of the shock absorbing mechanism corresponding substantially to the line 4—4 of Figure 2. Figures 5 and 6 are detailed, plan views respectively, of two different friction plates used in connection with my improved mechanism. Figure 7 is a horizontal sectional view of the forward end of the mechanism corresponding substantially to the line 7—7 of Figure 4. Figure 8 is a side elevational view of the friction shell shown as detached from the mechanism, and Figure 9 is a longitudinal vertical sectional view of the forward end portion of the spring cage of the mechanism.

In said drawings, 10—10 indicate channel-shaped center or draft sills of a railway car underframe, to the inner faces of which are secured front stop lugs 11—11 and rear stop lugs 12—12. The inner end of the drawbar is designated by 13, to which is operatively connected a hooded yoke 14. The shock absorbing mechanism proper, as well as the front main follower 15 is disposed within the yoke, the yoke and the parts contained therewithin being operatively separated by a detachable saddle plate 16.

My improved shock absorbing mechanism proper, as shown, comprises broadly, a spring cage A; a friction shell B; twin arranged main spring resistance elements C—C; a wedge D; two friction shoes E—E; two sets of friction plates F and G; a spring follower H; a preliminary spring resistance J; and a retainer bolt K.

The spring cage A is in the form of a generally rectangular box-like casting having longitudinally disposed top and bottom walls 17, a transverse rear end wall 18 and relatively short spaced side walls 19—19 at the forward end thereof, the shell being left open at the opposite sides for the major portion thereof to permit insertion of the main spring follower and spring resistance elements C when assembling the mechanism. The transverse end wall 18 co-operates with the stop lugs 12 in the manner of the usual rear follower. At the forward end, the side walls 19 of the cage A are provided with vertically disposed, inwardly projecting flanges 20—20. At the inner end, each side wall 19 is provided with lateral enlargements 21—21 inwardly projecting therefrom, the enlargements being arranged in pairs adjacent the top and bottom of each side wall. As most clearly shown in Figures 1 and 3, the side walls are cut away between the upper and lower enlargements 21 as indicated at 22, thereby providing guide ways adapted to accommodate the opposite sides of the spring follower H. At the forward side, each enlargement is provided with a transverse abutment face 23 inclined laterally, inwardly and rearwardly with reference to the axis of the mechanism. The top and bottom walls of the spring cage are left open between the enlargements and the flanges 20, these openings coinciding with the openings between the front faces 23 of the enlargements 21 and the transverse inner faces of the flanges 20.

The friction shell B is also of substantially rectangular transverse section and has lateral enlargements 24 at the rear end thereof. Each enlargement 24 is provided with a rear face 25 corresponding in inclination to the abutment faces 23 of the corresponding enlargement 21 and adapted to co-operate therewith as hereinafter pointed out. At the forward end, each enlargement 24 has a transverse abutment face 26 adapted to co-operate with the inner transverse face of the corresponding flange 20 to limit the outward movement of the friction shell. As most clearly shown in Figure 1, the flanges 20 and the abutment faces 23 of the enlargements 21 are spaced apart a greater distance than the front and rear faces of the corresponding enlargements 24 of the friction shell, thereby permitting a limited amount of relative movement between the friction shell and the spring cage casting. The friction shell is assembled with the spring cage by inserting the enlargements 24 of the former laterally between the flanges 20 and the enlargements 21 of the spring cage. To assist in maintaining the friction shell and spring cage assembled, the transverse abutment face 26 of the former is provided with transverse ribs 27 at the forward ends thereof adapted to co-operate with transverse indentations 28 on the rear walls of the flanges 20 of the spring cage. The top and bottom walls of the friction shell are provided with opposed, interior, longitudinally disposed rearwardly converging friction surfaces 29—29 adapted to co-operate with the friction plates.

The wedge D is in the form of a casting having a transversely disposed, plate-like section 30 provided with a central enlargement 31 projecting rearwardly therefrom and extending from the top to the bottom thereof, providing the wedge proper. At the opposite sides, the plate-like section 30 has a pair of vertically disposed flanges 32—32. The main wedge portion 31 has a pair of inwardly converging wedge faces 33—33 at the opposite sides thereof.

The friction wedge shoes E which are two in number, are of similar design. Each shoe E has a longitudinally disposed flat outer friction surface 34 adapted to co-operate with one of the friction plates, an interior wedge face 133 at the forward end thereof correspondingly inclined to and adapted to co-operate with one of the wedge faces 33 of the wedge 31, and a transverse face 35 at the rear end thereof adapted to serve as an abutment face co-operating with the front side of the spring follower H. The inner sides of the friction shoes E are cut away as shown in Figures 1 and 4, to accommodate the preliminary spring J, the outer end of which is adapted to abut transverse flat faces 36 on the respective shoes.

The friction plates F and G are arranged in two groups at the top and bottom of the mechanism, each group being interposed between one of the friction shoes E and the corresponding friction surfaces 29 of the friction shell. As most clearly shown in Figures 3 and 4, the friction plates of each group are four in number, there being two plates F and two plates G. The plates F of each group are of like construction, each plate being of generally rectangular outline and notched at opposite sides at the forward end thereof, thereby providing a forwardly projecting tongue 38 and transverse abutment shoulders 39. The tongue 38 of each plate is adapted to be accommodated between the flanges 32 of the plate-like section of the member D and the abutment shoulders 39 are adapted to co-operate with the inner ends of said flanges. The friction plates G are also of similar design, each plate being provided with a central tongue 38 and transverse abutment shoulders 39 similar to the tongue and shoulders hereinbefore described in connection with the plates F. At the rear end, each plate G has a pair of laterally projecting wings 40 having straight edges 41 at the forward side thereof and beveled edges 141 at the opposite sides of the rear end thereof. The beveled edges 141 are adapted to co-operate respectively with the abutment faces 23 of the enlargements 21 at the opposite sides of the spring cage. As most clearly shown in Figures 3 and 4, the plates G are alternated with the plates F, one of the plates F of each group being disposed outmost and co-operating with the corresponding friction surfaces 29 of the shell and one of the plates G of each group being disposed innermost and co-operating with one of the friction shoes E. As shown in Figure 1, the enlargements 24 at the opposite sides of the friction shell are provided with horizontally disposed openings 42 at the rear end thereof adapted to accommodate the wings 40 of the plates G of the top and bottom groups for longitudinal movement. The front edges 41 of the wings 40 of the plates are adapted to engage the transverse front end walls of the openings 42 of the enlargements of the shell to limit the outward movement of the plates G when the mechanism is in full release.

The spring follower H is in the form of a relatively heavy plate having top and bottom sections 43 of reduced width adapted to work between the top and bottom enlargements 21 of the spring cage. The sections 43 of the plate present flat abutment faces adapted to engage with the inner ends of the corresponding friction plates F. At the forward side, the spring follower H has a central enlargement 44 having a reduced outer end portion 45 adapted to extend into the friction shell between the innermost plates G of the two groups. At the inner end of said reduced outer end forming the enlargement 44 of the follower H are provided transverse top and bottom shoulders 46 adapted to co-operate with the inner ends of the innermost plates G of the two groups.

The main spring resistance element G comprises two relatively heavy coils at opposite sides of the mechanism and two relatively lighter coils telescoped therein, the spring resistance bearing at its opposite ends on the transverse end wall 18 of the spring cage and the rear face of the spring follower H respectively. The preliminary spring J which comprises a relatively light coil has its opposite ends bearing on the transverse abutment faces 36 of the friction shoes and the outer end of the enlargement 44 of the spring follower H.

The mechanism is held of uniform overall length and in assembled relation by the retainer bolt K which has its opposite ends anchored respectively to the enlargement 44 of the spring follower H and the main wedge D, the head of the bolt being accommodated for longitudinal movement within an opening 47 in the wedge. Outward movement of the spring follower H to which the bolt K is anchored, is limited by engagement with the inner end of the innermost plates G of each group, outward movement of these plates in turn being limited by engagement of the wings thereof with the transverse walls of the front ends of the openings in the lateral enlargements 24 of the friction shell. The shell B is restrained from outward movement by engagement of the enlargements 24 thereof with the flanges 20 of the spring cage.

In assembling the mechanism, the friction shell is attached to the spring cage by placing the enlargements 24 thereof laterally between the flanges 20 and the enlargements 21 of the spring cage. The friction plates G are then assembled with the friction shell, the plates being passed into the friction shell from the rear, through the spring cage, being inserted through one of the lateral openings of the latter. The spring follower H and the twin arranged main springs are then placed within the spring cage through the lateral openings thereof and the remaining parts of the mechanism comprising the plates F, friction shoes E and preliminary spring J are placed in position by placing the same into the friction shell from the front end thereof the retainer bolt K being first anchored to the spring follower H.

The normal position of the parts is that shown in Figure 1, the plates F bearing on the front face of the spring follower H, the abutment edges 41 of the wings 40 of the plates G engaging the transverse abutment faces of the enlargements 24 of the friction shell, and the enlargements 24 of the friction shell abutting the flanges 20 of the spring cage. It will be seen that when the parts are in this position, the abutment faces 25 of the friction shell are spaced a slight distance from the abutment faces 23 of the enlargements 21 of the spring cage and the abutment faces 141 of the plates G are also spaced from the faces 23, but a greater distance than the space between the faces of the friction shell and the faces 23. The outer ends of the friction plates F are also slightly spaced from the plate sections 30 of the wedge elements D, thereby providing for a certain amount of preliminary movement between the wedge member and the plates before the latter are engaged and actuated thereby. In the normal position of the parts, the inner ends of the wedge friction shoes E are also slightly spaced from the front side of the spring follower H to assure setting up of a wedging action on the shoes at the initiation of the compression stroke of the mechanism and permit of adjustment for overall length. Both the preliminary spring and the main springs are preferably under a certain amount of initial compression, the main springs being held under initial compression by the follower H which is limited in its forward movement by engagement with the innermost plates G as hereinbefore pointed out.

The operation of my improved shock absorbing mechanism, assuming a compression stroke, is as follows: The front follower 15 and the spring cage A are moved relatively toward each other, carrying the wedge member D inwardly of the mechanism, and setting up a wedging action between the same and the friction shoes, thereby compressing the groups of friction plates and forcing the same into intimate frictional contact with the friction surfaces of the shell. During this action, the preliminary spring will be compressed until the inner ends of the friction shoes come into abutment with the spring follower H. During the continued inward movement of the wedge D, the shoes and friction plates, together with the friction shell, will be carried inwardly in unison therewith, due to the friction existing between these parts, compressing the main springs between the spring follower H and the end wall 18 of the spring cage. The spring follower will be carried inwardly by engagement with the inner ends of the friction plates F, wedge shoes E and the innermost plates G of the two groups. This action will continue until inward movement of the friction shell is limited by engagement with the abutment faces 23 on the spring cage, whereupon the friction shoes and two groups of friction plates will be moved inwardly with reference to the shell substantially as a unit until the plates G are arrested by the abutment faces 141 thereof coming into engagement with the faces 23 of the spring cage. The plates G will thus be positively arrested, forcing the friction shoes to slide on the innermost plates G during the next stage of the compression stroke. This movement of the friction shoes with reference to the plates G will continue until the clearance between the plate-like sections 30 of the wedge members D and the outer ends of the friction plates F is taken up, whereupon the plates F will be forced rearwardly in unison with the wedge D and friction shoes, the plates F slipping on the plates G and the friction surfaces of the shell, thereby greatly augmenting the frictional resistance during the remainder of the compression stroke. It will be evident that the spring follower H will be moved out of engagement with the rear end of the plates during the compression of the mechanism, thereby greatly facilitating release inasmuch as the initial expansion of the main spring resistance will act to release the wedge friction system prior to any movement of the friction plates, movement of the plates not taking place until the clearance between the follower and the inner ends of the former is taken up. Upon engagement of the spring follower with the friction plates F, the same will be projected outwardly of the friction shell, carrying the plates G therewith, due to the friction existing between these plates. Outward movement of the plates G will be arrested by engagement of the wings 40 thereof with the transverse abutment faces on the friction shell, whereupon the plates F will be forced outwardly relatively to the plates G until movement of the spring follower H is arrested by engagement with the inner ends of the innermost plates G of each group. The preliminary spring J acts to restore the friction wedge shoes and wedge to normal position, outward movement of the main wedge being limited by the retainer bolt K.

By providing the graduated action comprising the successively increasing stages of resistance, my gear is particularly adapted for passenger car service as abrupt and sudden shocks are entirely eliminated due to the blending of the different stages of compression.

While I have herein shown and described the preferred manner of carrying out my invention, the same is merely illustrative and I contemplate all changes and modifications that come within the scope of the claims appended hereto.

I claim:

1. In a friction shock absorbing mechanism, the combination with a column element; of a friction shell, said shell and element having limited relative movement; a main spring resistance; a plurality of intercalated friction plates within the shell, said plates and column element being relatively movable; lateral pressure-creating means co-operating with said plates; pressure-transmitting means adapted to engage certain of said plates to force the same rearwardly of the mechanism; and means for arresting movement of the remaining plates after a predetermined compression of the mechanism.

2. In a friction shock absorbing mechanism, the combination with a column member; of a friction element, said element and member having limited relative movement; a main spring resistance; a plurality of intercalated friction plates co-operating with said element, said plates and column member being relatively movable; means for placing said plates under lateral pressure and forcing the same against said element; means co-operating with certain of said plates for forcing the same longitudinally of the mechanism; and means for arresting movement of the remaining plates after a predetermined compression of the mechanism.

3. In a friction shock absorbing mechanism, the combination with a column member; of a friction shell, said shell and member having limited relative movement; a main spring resistance; a plurality of intercalated friction elements co-operating with the shell, said plates and column member being relatively movable; means for placing said elements under lateral pressure; means normally spaced from certain of said elements for engaging and moving the same inwardly after a predetermined compression of the mechanism; and means for arresting movement of the remaining elements prior to full compression of the mechanism.

4. In a friction shock absorbing mechanism, the combination with a column member; of a friction shell, said shell and member having limited relative movement; a main spring resistance; a plurality of intercalated friction elements co-operating with the shell, said plates and column element being relatively movable; means for placing said elements under lateral pressure; means normally spaced from certain of said elements for engaging and moving the same inwardly after a predetermined compression of the mechanism; and means for arresting movement of the remaining elements prior to engagement of the other elements by said second named means.

5. In a friction shock absorbing mechanism, the combination with a spring cage; of a friction shell, said shell and cage having limited relative movement; co-operating means on said shell and cage for arresting relative movement thereof after a predetermined initial compression of the mechanism; spring resistance means within said cage co-operating with the shell; a plurality of intercalated friction elements within said shell, said elements being bodily movable with reference to the shell; means for placing said elements under lateral pressure; means upon the cage co-operating with certain of said elements for arresting movement of the latter prior to full compression of the mechanism; and means co-operating with the remaining elements for forcing the same inwardly of the mechanism.

6. In a friction shock absorbing mechanism, the combination with a spring cage; of a friction shell, said shell and cage having limited relative movement; a spring resistance within said cage; a plurality of intercalated friction elements co-operating with the shell, said elements being bodily movable with reference to the shell to a limited extent; lateral pressure creating means co-operating with said elements; means on said cage for arresting inward movement with reference to the cage, successively of said shell and certain of said elements; and means co-operating with the remaining elements for carrying the same inwardly of the shell and effecting relative movement between said last named elements and said arrested elements during the final compression of the mechanism.

7. In a friction shock absorbing mechanism, the combination with a casing; of a friction shell, said shell and casing having limited relative movement; a spring resistance within said casing; a plurality of interengaging friction plates co-operating with the shell, said plates being bodily movable with reference to the shell; means for placing said plates under lateral pressure; means for successively arresting inward movement with reference to the casing of said shell and certain of said plates; and means normally spaced from the remaining plates for engaging the same after a predetermined compression of the mechanism and carrying the same inwardly of the shell and said arrested plates.

8. In a friction shock absorbing mechanism, the combination with a spring cage; of a main follower acting member having wedge means associated therewith, said member and cage being relatively movable with reference to each other; a friction shell, said shell and cage having limited relative movement; a plurality of intercalated friction plates within the shell, said intercalated plates being movable as a unit during a predetermined portion of the compression stroke, certain of said plates having engagement with the cage to limit their movement inwardly of the mechanism, while the remaining plates are adapted to move inwardly with reference thereto, said last named plates being normally spaced from said follower acting member; wedge-friction-shoes co-operating with said wedge means and intercalated plates; and spring means resisting movement of said shoes and shell inwardly of the cage.

9. In a friction shock absorbing mechanism, the combination with a spring cage; of a friction shell having inwardly converging friction surfaces, said shell and cage having limited relative movement; follower-acting means having a wedge member associated therewith, said follower means and cage being relatively movable with reference to each other; groups of intercalated friction plates within the shell, said groups of plates being movable as a unit with reference to the cage during a predetermined portion of the compression stroke, certain of said plates having engagement with the cage to limit their relative movement inwardly of the latter while the remaining plates of each group are adapted to move inwardly relatively to the shell; wedge-friction-shoes co-operating with said groups of plates and wedge member; a spring follower; a main spring interposed between said spring follower and cage; and a preliminary spring interposed between the wedge friction shoes and the spring follower.

10. In a friction shock absorbing mechanism, the combination with front and rear stops; of a spring cage co-operating with certain of said stops; a friction shell, said cage and shell having limited relative movement; a main follower co-operating with the remaining stops; a yoke embracing said follower and cage; a plurality of intercalated friction plates within said shell, said plates being movable bodily as a unit with reference to said cage during a predetermined portion of the compression stroke of the mechanism, certain of said plates having engagement with the cage to limit their movement inwardly of the latter while the remaining plates are adapted to move inwardly relatively to the cage; wedge-pressure-creating means for placing said plates under lateral pressure; and a main spring resistance within said cage.

11. In a friction shock absorbing mechanism, the combination with a spring cage;

of a friction shell, said shell and cage having limited relative movement; a spring resistance within said cage; a spring follower co-operating with said spring resistance; groups of intercalated friction plates within the shell; the innermost plates of said groups normally bearing on said spring follower; a lateral pressure creating friction system interposed between said groups of plates, said groups of plates being bodily movable as a unit during a compression stroke of the mechanism; means for arresting movement of certain of said plates after said predetermined compression while permitting movement of the remaining plates with reference thereto.

In witness that I claim the foregoing I have hereunto subscribed my name this 23rd day of May, 1925.

JOHN F. O'CONNOR.